Oct. 11, 1966 H. D. POST ETAL 3,278,117

PORTABLE TAPE PERFORATOR

Filed May 6, 1964 4 Sheets-Sheet 1

INVENTORS
Herman D. Post
Edward Perper
BY
Michael J. Striker
Atty

Oct. 11, 1966 H. D. POST ET AL 3,278,117

PORTABLE TAPE PERFORATOR

Filed May 6, 1964 4 Sheets-Sheet 2

INVENTORS
Herman D. Post
Edward Porper

BY

Richard J. Striker
Atty

Oct. 11, 1966

H. D. POST ETAL 3,278,117

PORTABLE TAPE PERFORATOR

Filed May 6, 1964

4 Sheets-Sheet 3

INVENTORS
Herman D. Post
Edward Perper
BY
Michael J. Striker
Atty

PORTABLE TAPE PERFORATOR

Filed May 6, 1964

4 Sheets-Sheet 4

INVENTORS
Herman D. Post
Edward Perper

BY

Michael J. Striker
Atty

United States Patent Office 3,278,117

Patented Oct. 11, 1966

3,278,117

PORTABLE TAPE PERFORATOR

Herman D. Post, Great Neck, and Edward Perper, Brooklyn, N.Y., assignors to Robins Industries Corporation, Flushing, N.Y.

Filed May 6, 1964, Ser. No. 365,388

18 Claims. (Cl. 234—100)

The present invention relates to a perforator.

More particularly, the present invention relates to a tape perforator which is adapted to perforate tape of the type used in calculating machines and the like.

Tapes of this type at the present time can be perforated according to a given code so that a given set of information can be stored in the tape. For example, there are known typewriters which actuate mechanisms which perforate the tape according to a code which is derived from the letters and numbers which can be typed with the typewriter, so that such a tape will have stored on it the information which has been introduced into the typewriter, and thereafter the tape can be used for many different purposes such as for automatically operating a machine according to the information which is put into the tape, and many other uses of such perforated tapes are well known. However, a considerable inconvenience is encountered when using tapes of the above type because they can only be perforated at a machine which is designed for that purpose, and this means that when any changes in the tape are to be made in the field, it is not possible to make such changes on the spot but instead it is necessary to return the tape to a location where there is a suitable machine which can correct the information which has been introduced or which can introduced additional information. For example when using such a tape to operate a machine in an automatic manner it may be found that it is desirable to produce a slight additional operation of the machine or to change one of the operations, and at the present time it is essential to return the tape to the machine on which it was originally perforated or to a similar machine to make such corrections or additions.

It is a primary object of the present invention to provide a portable tape perforator which is small and light and which can be easily carried about and operated at any location to introduce perforations according to a given code into a tape so that with this portable tape perforator of the present invention it becomes possible to perforate a tape at any location, and thus it is not necessary to carry out tape perforations only at the original machine on which the tape was originally perforated, or on a similar machine.

A further object of the present invention is to provide a portable tape perforator which can conveniently be operated in a purely manual manner so that it is not necessary to have any source of power available for operating the perforator of the invention.

In addition it is an object of the present invention to provide a portable tape perforator which even though it is of a small size nevertheless is capable of introducing a very large amount of information according to a given code into the tape.

Yet another object of the present invention is to provide a portable tape perforator which will automatically advance a tape by a given increment after each operating cycle to introduce information according to a given code on the tape by perforating the latter.

Furthermore, it is an object of the present invention to provide a portable tape perforator which will not only automatically advance the tape after each operating cycle but which will also enable the operator to manually advance the tape to any desired location where it is desired to perforate the tape.

Still another object of the present invention is to provide a portable tape perforator which makes it possible to thread the tape onto the perforator and to remove it from the perforator in a simple, quick and easy manner.

Also it is an object of the present invention to provide a portable perforator of the above type which includes a safety structure which will prevent damage to the perforator in the event that any parts thereof become jammed.

The object of the present invention also includes the provision of a portable tape perforator of the above type which can accomplish all of the above objects and which at the same time is composed of an assembly of simple rugged elements which are inexpensive to manufacture and assemble and which are very reliable in operation.

With these objects in view the invention includes, in a portable tape perforator, a support means which has a tape supporting portion which is adapted to support a tape which is to be perforated. This support means also supports a perforator means which will selectively perforate the tape according to a selected pattern of perforations at each operating cycle of the perforating means, and a manually operable means can be connected to the perforating means to manually operate the latter. Moreover, the support means carries a tape advancing means which is capable of advancing the tape automatically after it is perforated at each operating cycle of the perforating means, and in addition this tape advancing means of the invention can be manually operated so as to manually advance the tape in order to locate any selected portion of the tape in a position to be perforated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figures 1, 2:
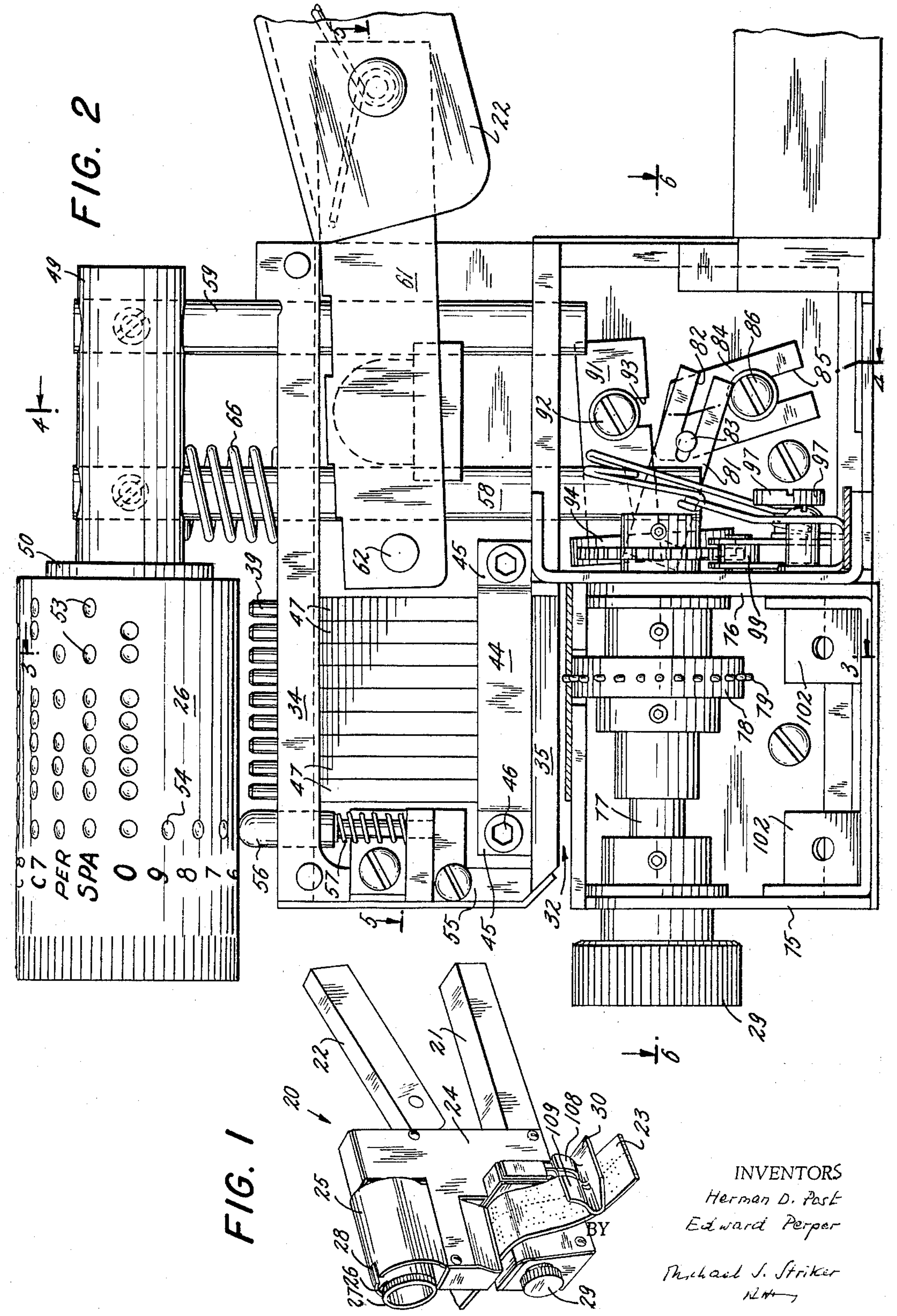
FIG. 1 is a perspective illustration of a portable tape perforator according to the present invention.
FIG. 2 is a front elevation at an enlarged scale as compared with FIG. 1 of the tape perforator of the present invention, parts of a handle and operating lever being omitted from FIG. 2 and in addition the cover and presser foot elements of the perforator being also omitted for the sake of showing the details of the structure.

Referring now to the drawings and to FIG. 1 in particular, there is shown therein a portable tape perforator 20 according to the invention, this perforator including a support means which carries all of the various components including a handle 21 accessible to the operator for providing hand-support of the perforator during operation thereof. The perforator includes an operating lever which has a manually engageable portion 22 accessible to the operator, and when the operator manually turns the portion 22 of the operating lever toward the handle 21 the perforator will be actuated to make perforations in a tape such as the tape 23 shown in FIG. 1. The structure is covered by a suitable, easily removable covering means 24 which has a portion 25 extending around a cylindrical selecting member 26 which has a knurled portion 27 accessible to the operator so that the operator can turn the selecting member 26. The selecting member 26 carries indicia distributed circumferentially about the selecting member 26 and visible through a window formed by a notch 28 of the covering portion 25, so that the operator can engage the knurled portion 27 of the member 26 and turn the latter until a selected indicium is visible through the notch or window 28. In a manner which is described below the perforator will act to perforate the tape 23 in accordance with the selected information which is to be introduced into the tape, and this perforation of the tape is carried out by actuating the lever 22 by displacing it manually toward the handle 21, as mentioned above.

The structure will operate to automatically advance the tape 23 by a given increment after each operating cycle of the perforating means, in response to depression of the lever portion 22, but in addition it is possible to manually move the tape 23 until a selected portion thereof is in a position to be perforated, and for this purpose there is accessible to the operator a knurled knob 29 which can be turned in one direction or the other for the purpose of moving the tape 23 longitudinally in one direction or the other.

In order to properly position the tape 23 to be perforated a presser foot 30 is provided, and this presser foot 30 is turnable from its operating position to an inoperative position shown in FIG. 1 where the presser foot is displaced away from the tape so as to make it easy to remove the tape 23 from the perforator or to thread it into the perforator.

Figures 3, 4:
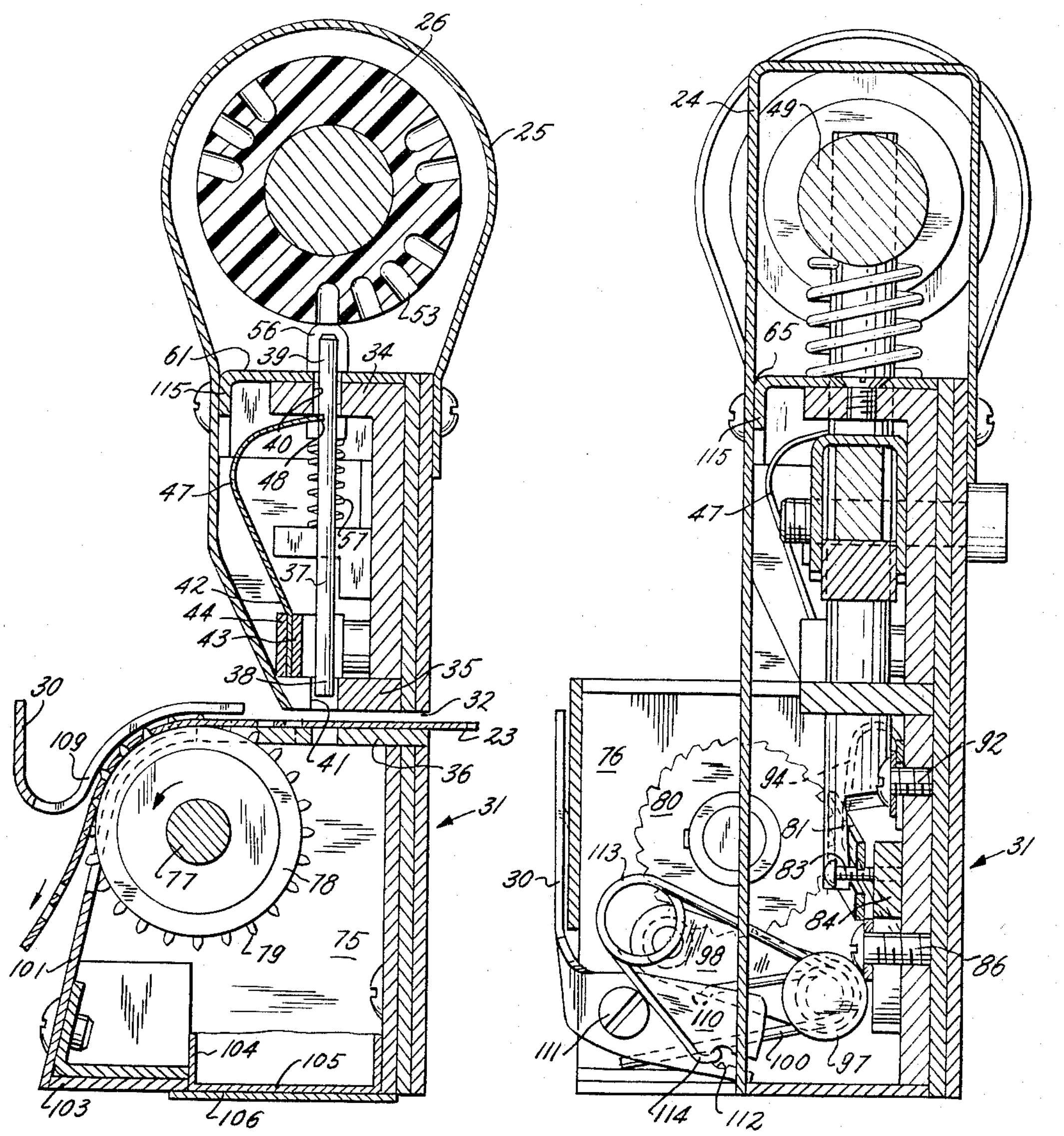
FIG. 3 is a transverse sectional elevation of the structure of FIG. 2 taken along line 3—3 of FIG. 2 in the direction of the arrows, FIG. 3 however adding to the structure of FIG. 2 the covers which are omitted from FIG. 2.
FIG. 4 is a transverse sectional elevation taken along line 4—4 of FIG. 2 in the direction of the arrows and also including the covers which are omitted from FIG. 2.

The structure includes a support means for supporting all of the various components, and this support means includes a rigid wall 31 shown most clearly in FIG. 3 and in the illustrated example being made up of metal plates. The rigid wall 31 has a notch 32 which extends all the way to the left of the perforator, as viewed in FIGS. 2 and 7, and above the notch 32 the wall 31 has fixedly connected thereto a pair of flanges 34 and 35 while below the notch 32 the wall 31 has rigidly connected thereto a flange 36. The tape 23 is introduced into the notch 32 and rests on the flange 36 which thus forms a tape supporting portion of the support means. Although separate plate members are shown and assembled together to form the structure of FIG. 3, the supporting structure can also be formed by an integral one-piece casting. Thus, the wall 31 together with the flanges 34–36 may be cast in one piece in a suitable mold.

The perforations are made by a plurality of punches 37 arranged in a row which extends transversely with respect to the direction of movement of the tape 23, and these punches 37 respectively have lower punching ends 38 directed toward but spaced from the tape supporting portion 36 when the punches 37 are in a rest position. The punches 37 have opposite to their lower punching ends 38 upper free ends 39 which are adapted to be engaged by a selective punch engaging means, formed by the selecting member 26, for the purpose of actuating selected punches in a manner described below. The pair of flanges 34 and 35 form a guide means for guiding the punches 37 for longitudinal movement, and for this purpose the upper flange 34 is formed with a row of openings 40 through which the punches 37 respectively extend, and the lower flange 35 is formed with a row of openings 41 aligned with the openings 40 and into which the punches 37 also extend, so that in this way the punches are guided for longitudinal movement.

A spring means releasably and yieldably holds the punches 37 in a rest position where their lower punching ends are in the openings 40 but spaced above the bottom surface of the flange 35. This spring means is formed by a single relatively wide leaf spring member 42 which is fixed at its bottom end between a pair of plates 43 and 44. The inner plate 43 is fixed to the plate 44 in any suitable way so as to clamp the lower end of the leaf spring 42 between these plates, and the outer plate or strip 44 has suitably bent free ends which extend perpendicularly with respect to the plane of the lower part of the leaf spring 42 toward the wall 31 where the strip 44 has outwardly directed ears 45 (FIGS. 2 and 7) which are fixed by suitable screws 46, with the interposition of suitable spacers, to the wall 31, so that in this way the leaf spring 42 is fixedly mounted at its bottom end. This leaf spring curves at its upper end in a manner shown most clearly in FIG. 3 and in addition it is formed with a plurality of elongated parallel slits which extend from the top end of the leaf spring through the leaf spring almost to the fixing elements 43 and 44 so that in this way the leaf spring has a plurality of independent tongues 47 which are freely yieldable with respect to each other and which are respectively aligned with the several punches 37. The punches 37 are respectively formed with notches 48 (FIG. 3) which respectively receive the free ends of the tongues 47 and into which the tongues 47 press as a result of inherent resiliency so that there is no tendency of the tongues 47 to be displaced out of the notches 48, respectively, and thus the tongues 47 of the leaf spring 42 continuously urge the punches 37 upwardly. The upper ends of the tongues 47 engage the underside of the flange 34 to limit the extent of upper movement of the punches and thus determine their rest position which is illustrated in FIG. 3.

As was pointed out above the selecting member 26 forms an engaging means for engaging the free ends 39 of the punches, and this selecting member 26 is in the form of a cylinder which is mounted on a shaft 49 (FIG. 7) coaxially therewith for free turning movement relative thereto. As may be seen from FIG. 7 the shaft 49 fixedly carries a collar 50 engaging the inner end of the cylinder 26 while the outer end of the cylinder 26 is formed with an enlarged bore portion receiving a washer 51 which is fixed to the shaft 49 by a screw 52 so that in this way while the cylindrical selecting member 26 is free to rotate relative to the shaft 49 it cannot move axially with respect to the shaft 49.

Some of the indicia carried by the selectively operable punch engaging member 26 is illustrated in FIG. 2. In alignment with the indicia the member 26 is formed with a plurality of cutouts in the form of radial recesses having a selected pattern and corresponding to the particular indicia which is printed or otherwise marked on the member 26. The series of cutouts or recesses for the indicia appearing at the upper part of FIG. 2 is indicated by way of example, and for the numerals appearing at the lower part of the member 26 in FIG. 2 there will be additional sets of recesses which are not illustrated since any combinations of recesses may be provided. These recesses 53 are designed to receive the free ends 39 of the punches 37 when the member 26 is moved downwardly. This member 26 is formed with a plurality of detent recesses 54 arranged circumferentially about the member 26 and aligned with all of the indicia in the manner shown in FIG. 2, and the wall 31 carries a bracket 55, between the flanges 34 and 35, and this bracket 55 is formed with a bore for guiding the stem of a detent pin 56 which has a rounded free end adapted to enter into any one of the detent recesses 54. A coil spring 57 is coiled about the stem of the pin 56, engages a downwardly directed shoulder of the pin 56 and the top face of the bracket 55, and thus urges the pin 56 into engagement with the cylinder 26 so as to enter into a selected one of the recesses 54 thereof. When the operator aligns one of the indicium with the window 28 the detent pin 56 will automatically enter into one of the recesses 54 for properly positioning the selecting member 26.

Figures 7, 8:
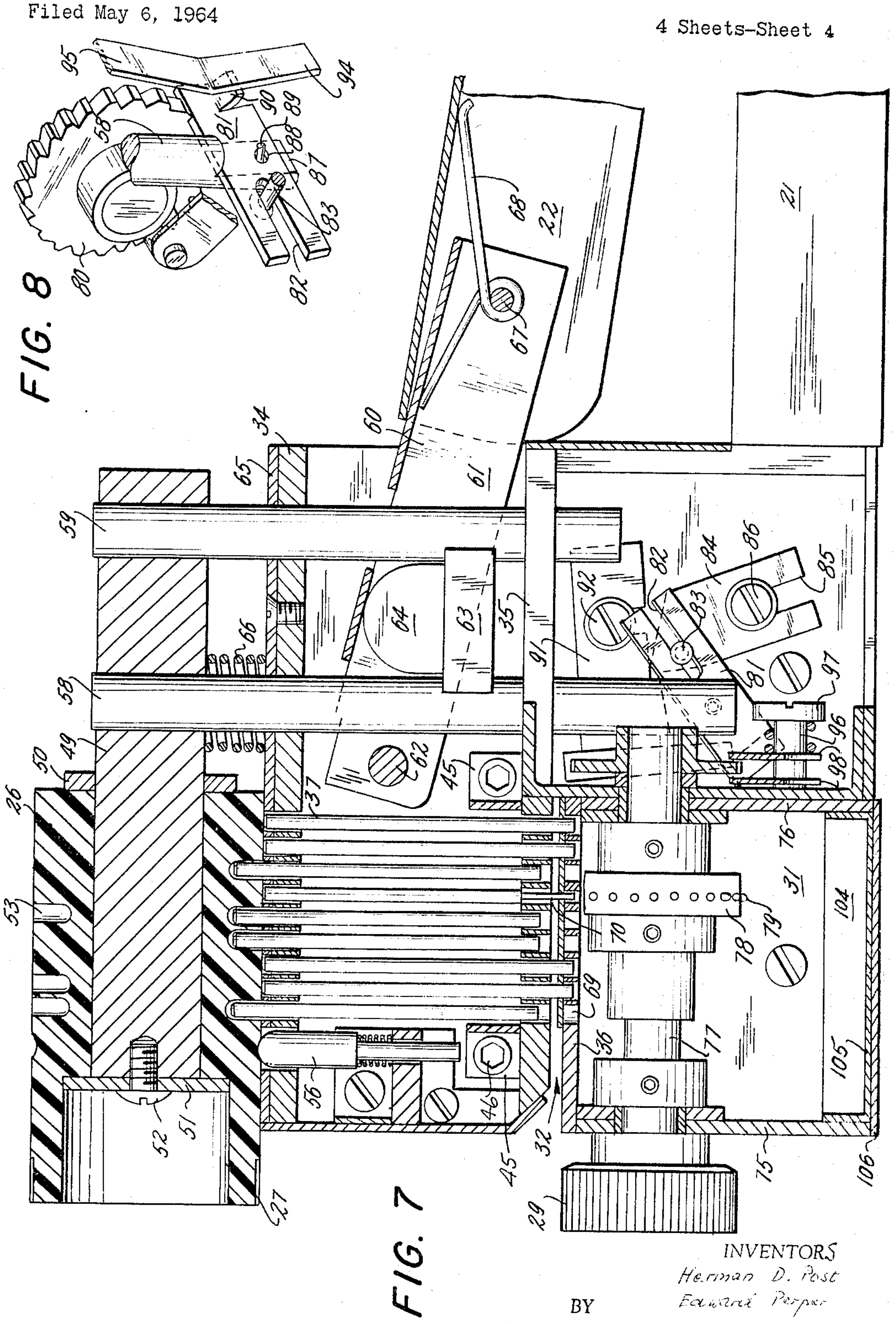
FIG. 7 shows the structure of FIG. 2 in the position which it takes after having been actuated to perforate a tape and before the parts have returned to the rest position shown in FIG. 2.
FIG. 8 is a fragmentary perspective illustration of a pawl and ratchet mechanism according to the invention.

In order to carry out an operating cycle the member 26 is moved downwardly from the position of FIG. 2 into the position of FIG. 7, with the result that the non-selected punches 37 will be received at their free ends 39 in recesses 53 and thus will not be depressed while the selected punches 37 will be engaged by the exterior surface of the selecting member 26 to be moved downwardly when the latter moves downwardly, and FIG. 7 illustrates how some of the selected punches 37 are depressed in this manner. As is apparent from FIG. 7 the detent pin 56 also is depressed in opposition to the spring 57.

The perforating means includes in addition to the several punches 37 and the selecting member 26 a pair of rods 58 and 59 which are fixed to and extend perpendicularly from the shaft 49 through pairs of aligned openings of the flanges 34 and 35 so that in this way these parallel rods 58 and 59 are guided for vertical movement by the support means which of course includes the flanges 34 and 35 at the portions thereof which guide the rods 58 and 59. The rods 58 and 59 extend through suitable cutouts formed in the upper wall 60 of an elongated channel member 61 which forms part of the manually operable lever means and which has its side walls pivotally supported by a stationary pivot pin 62 carried by the wall 31 of the support means. The rods 58 and 59 are formed with aligned notches which are directed toward each other and which receive the ends of a rigid block 63 (FIG. 7) on which a second block 64 rests, the block 63 being of rectangular configuration while the block 64 has an upper semicircular end engaging the underside of the side wall 60 of the channel 61 between the rods 58 and 59, as indicated in FIG. 7. Thus, when the channel or lever member 61 is turned in a clockwise direction, as viewed in FIG. 7, the wall 60 will engage the block 64 and move the latter together with the block 63 and the rods 58 and 59 downwardly so as to move the punch engaging member 26 downwardly from the position of FIG. 2 into the position of FIG. 7, and it is apparent that the downward movement is limited by engagement of the member 26 with a plate 65 which is fixed to the upper surface of the flange 34. A spring 66 is coiled about the rod 58 between the plate 65 and the underside of the shaft 49 and this spring 56 urges the parts 26, 49, 58, 59 to their rest position shown in FIG. 2. The upper wall 60 of the lever 61 engages the under side of the flange 34, as shown in FIG. 2, so as to limit the upward movement of the rods 58 and 59 by the spring 66, and in this way the rest position of the punch engaging member 26 is determined.

The manually operable lever means for actuating the perforating means formed by the punches, the member 26, and the carrier means 49, 58, 59 which carries the member 26, includes in addition to the lever 61 the above-described manually engageable portion 22 which, as is apparent from FIGS. 2 and 7, is also in the form of an elongated channel. The left end portion of the lever 22 overlaps the right end portion of the lever 61, and these lever or lever portions 22 and 61 are pivotally connected to each other by an elongated pin 67 which may have its outer ends riveted or upset against the exterior surface of the side walls of the lever portion 22. A relatively strong and heavy wire spring 68 is coiled about the pin 67 in the interior of the channel 61 and has its free ends respectively pressing against the undersides of the top walls of the pair of channels 61 and 62, as shown most clearly in FIG. 7 so that the springs 68 maintains the parts in the position shown in FIGS. 2 and 7 where the left end edge of the upper wall of the lever 22 engages the upper surface of the lever 61. This spring 68 is much stronger than the total of the forces of the springs 66, 42, and 57, so that normally there will be very little movement of the lever portion 22 relative to the lever portion 61 during operation of the perforator. However, if any of the parts should jam, such as if some solid piece or object should become located beneath one of the punches, then the spring 68 will yield to permit the lever 22 to turn relative to the lever 61, and in this way damage to the apparatus will be avoided by such unexpected jamming, and thus the spring 68 forms a safety structure to prevent damage to the elements in the event of jamming for any reason.

Figure 9:
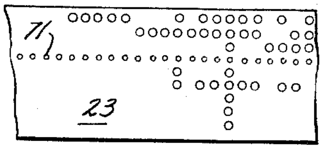
FIG. 9 is a fragmentary illustration of a perforated tape.

The tape supporting flange 36 is formed, as shown most clearly in FIG. 7, with a row of aligned openings 69 which are respectively aligned with the openings 41 of the flange 35, so that when the selected punches are depressed their punching ends will pass through a tape 23 and into openings 69 of the supporting flange 36. The fourth punch 37 from the right, as viewed in FIG. 7, has a lower punching portion 70 of a smaller diameter than the remaining punching ends of the punches. As may be seen from FIG. 9 the tape 23 may be preformed with a row of relatively small perforations 71 which extend longitudinally of the tape 23, and the smaller punching end 70 of the fourth punch 37 from the right, as viewed in FIG. 7 may be received in the successive perforations 71 during operation of the perforator. On the other hand, it is to be noted that such a preformed row of perforations 71 is not at all essential and if instead the tape simply has a leader portion formed with a relatively short row of perforations 71, then as the tape continues to advance in the perforator the punching end 70 will form a row of perforations 71. The selecting member 26 does not have any recesses aligned with the fourth punch from the right, as viewed in FIG. 7, and thus at each actuation of the perforator the smaller punching end 70 will move down through the tape either to form one of the openings 71 or to be received in one of these perforations.

Situated beneath the structure which has been described above is a structure for advancing the tape either automatically or manually, and this structure will now be described. As may be seen from FIGS. 2 and 7 a pair of wall structures 75 and 76 are fixed to and extend forwardly from the wall 31 and form with the latter part of the support means, and the pair of wall structures 75 and 76 are formed with aligned openings carrying suitable bearings through which a rotary shaft 77 passes so that in this way the shaft 77 is supported for rotation. This shaft 77, at its end which extends to the left beyond the wall 75, as viewed in FIGS. 2 and 7, carries the knob 29 which is accessible to the operator for manual turning of the shaft 77. Between the walls 75 and 76 the shaft 77 fixedly carries a wheel 78 which fixedly carries at its periphery a plurality of radially extending pins 79 which are spaced from each other by a distance equal to the distance between the openings 71, and these pins 79 are adapted to extend into the openings 71 so as to guide and transport the tape 23, so that the wheel 78 with its pins 79 forms a tape engaging means for engaging and supporting the tape.

On the right side of the wall structure 76 the shaft 77 fixedly carries a ratchet wheel 80 which is shown most clearly in FIG. 4, and a pawl 81 cooperates with the ratchet wheel 80 for advancing the latter. The pawl 81 is in the form of a flat leaf spring having at its right end portion an elongated slot 82 receiving a pin 83 which is fixed to a plate 84, and this plate 84 is itself formed with a slot 85 through which passes the threaded shank of a screw 86 whose head engages the face of the member or plate 84 which is visible in FIGS. 2 and 7, so that in this way the screw 86, which is threaded into the wall 31, fixes the plate 84 to the wall 31. By loosening the screw 86 it is possible to adjust the plate 84 and thus adjust the position of the pin 83 so as to adjust the operation of the pawl 81.

As is best shown in FIG. 8, the pawl 81 is received in a notch 87 which is formed at the lower end of the rod 58 and which is directed rearwardly. The leaf spring 81 formed with an opening 88 which receives with substantial clearance a pin 89 fixed to the rod 58 so that as the latter moves up and down the pawl 81 will turn about the pin 83 while being free to move longitudinally with respect thereto. At its right end portion, as viewed in FIG. 8, the pawl 81 is formed with a lower, rearwardly extending tongue 90 which is deflected from the plane in which the remainder of the pawl 81 is situated.

A leaf spring member 91 has a rear flat wall portion fixed directly to the inner surface of the wall 31 by a screw 92 which passes through a notch 93 which is formed in the flat rear wall portion of the leaf spring member 91, and at its left end, as viewed in FIG. 1, the leaf spring member 91 has an elongated leaf spring finger 94 which extends behind the pawl 81 and resiliently urges the latter against the teeth of the ratchet wheel 80. This finger 94 is also shown in FIG. 8, and as may be seen from FIG. 8 the finger 94 is angularly shaped so as to have a crest 95 which is directed forwardly and engages the rear face of the pawl 81 in alignment with the rearwardly directed tongue 90 thereof.

With this construction each time the rod 58 moves down so as to place the punch engaging member 26 in engagement with the selected punches 37 in order to perforate the tape 23, the left end portion of the pawl 81, as viewed in FIGS. 2 and 7, also moves down while the pawl swings in a counterclockwise direction about the pin 83, and at this time the pawl will simply slip with respect to the ratchet wheel 80 without turning the latter. Thus, the tape 23 remains stationary while the perforating punches 37 pass therethrough in the manner described above. When the spring 66 returns the parts to their position shown in FIG. 2 the upwardly moving rod 58 will swing the pawl 81 upwardly so that the upper edge of the pawl 81 will engage a tooth of the ratchet wheel 80 for turning the latter through an increment sufficient to displace the wheel 78 by an angular distance equal to that between a pair of successive pins 79, and thus the tape 23 will be advanced by the distance between a pair of successive perforations 71 thereof so as to be situated in a position to have the next area ready to be perforated. As may be seen from FIG. 7, at the bottom position of the rod 58 the pawl 81 is displaced downwardly to a considerable extent so that it will turn freely before engaging and turning the ratchet wheel 80, and thus the selected punches 37 have ample opportunity to move upwardly beyond the tape 23 before the ratchet wheel 80 is actually turned so as to turn the wheel 78 and advance the tape.

Before the rod 58 reaches its uppermost rest position shown in FIG. 2 the tongue 90 of the pawl 81 reaches the crest 95 of the springy finger 94 which presses the pawl 81 toward the ratchet wheel, and when the tongue 90 rides over the crest 95 the pawl 81 will be rocked rearwardly at its upper edge portion so that the front face of the pawl will then ride upwardly along the edge of the tooth which just previously was engaged by the top edge of the pawl 81, and in the rest position of the parts shown in FIG. 2 the teeth of the ratchet wheel 80 engage the front face of the pawl so that the ratchet wheel 80 is free to turn in either direction relative to the pawl. It is only when the rod 58 again moves downwardly that the pawl 81 will be pressed forwardly to engage the next tooth by engagement of the creast 95 of the springy finger 94 with a portion of the rear face of the pawl 81 which is higher than the rearwardly directed tongue 90 thereof.

Because the pawl 81 in its rest position frees the ratchet 80 for movement in either direction, it is possible in the rest position of the structure for the operator to turn the knob 29 in either direction and thus advance the tape 23, by way of the pins 79 which extend into the openings 71 of the tape 23 in either direction to locate any selected part of the tape in alignment with the punches 37 to be perforated thereby.

The wall structure 76 carries a pin 96 which has a head 97 at its right end, as viewed in FIGS. 2 and 7, and this pin 96 pivotally supports a pair of levers 98 which in turn carry distant from the pin 96 a roller 99 situated between the levers 98 and supported for free rotation on a pin which passes through the roller 99 and which has its ends connected to the levers 98. A wire spring 100 (FIG. 4) is coiled about the pin 96, has one leg engaging the bottom wall of the perforator and has another leg hooked beneath the right lever 98 of FIGS. 2 and 7, so that in this way the spring 100 urges the pair of levers 98 to turn in a clockwise direction, as viewed in FIG. 4, and the roller 99 engages the ratchet wheel 80 between a pair of the teeth thereof, as shown most clearly in FIG. 4, so that in this way the lever assembly 98 together with the roller 99 and the spring 100, as well as the pin 96 form a detent means cooperating with the ratchet teeth for releasably holding the ratchet wheel in predetermined angular positions, and in addition this detent structure holds the wheel 80 stationary while the pawl 81 slides with respect to the tips of the teeth of the ratchet wheel in the manner described above.

As the perforator of the invention is operated, the several punches will displace from the tape 23 small circular portions thereof which form the chad which collects in the chamber between the wall structures 75 and 76 and between the rear wall 31 and a front wall 101 (FIG. 3) which is screwed onto the pair of ears 102 shown most clearly at the lower left of FIG. 2, so that this wall 101 forms part of the covering structure, and the bottom wall structure 103 is formed with an opening which receives the springy flanges 104 of a member 105 which is fixed to a bottom cover plate 106 which can be removed at any time to allow the chad to be taken out of this chamber, and then the bottom cover 106 can be replaced with the flanges 104 of the member 105 frictionally engaging the wall structure so that the cover 106 will be maintained in position.

Figure 5:
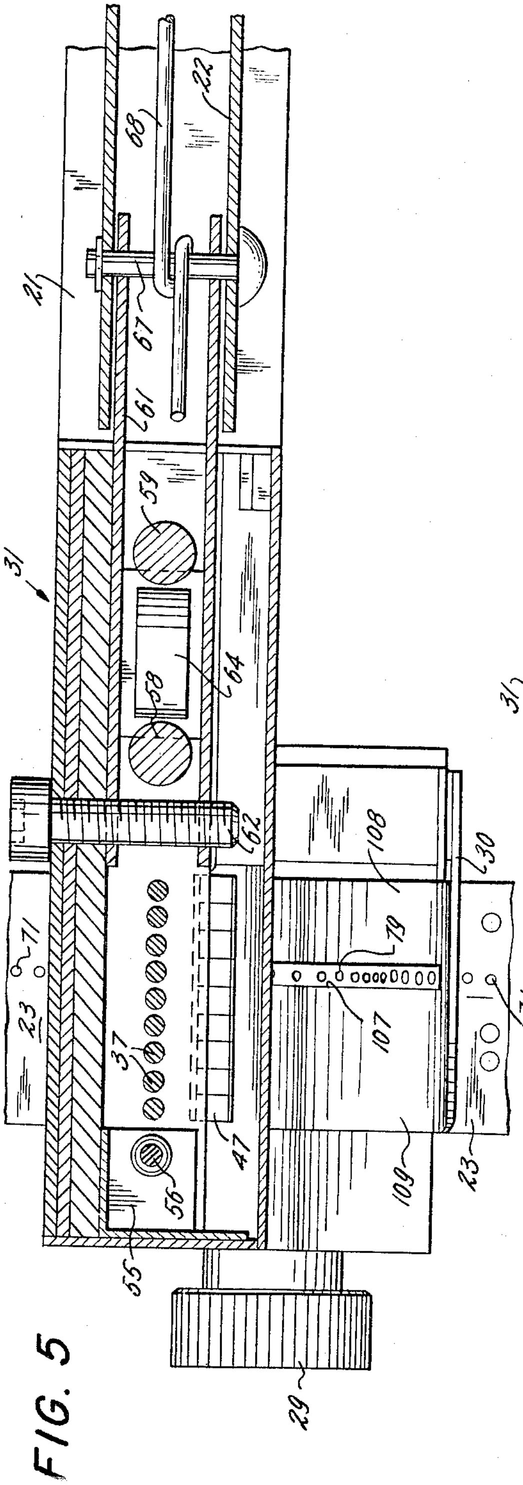
FIG. 5 is a longitudinal sectional plan view taken along line 5—5 of FIG. 2 in the direction of the arrows and also illustrating part of the cover structure which is omitted from FIG. 2.
Figure 6:
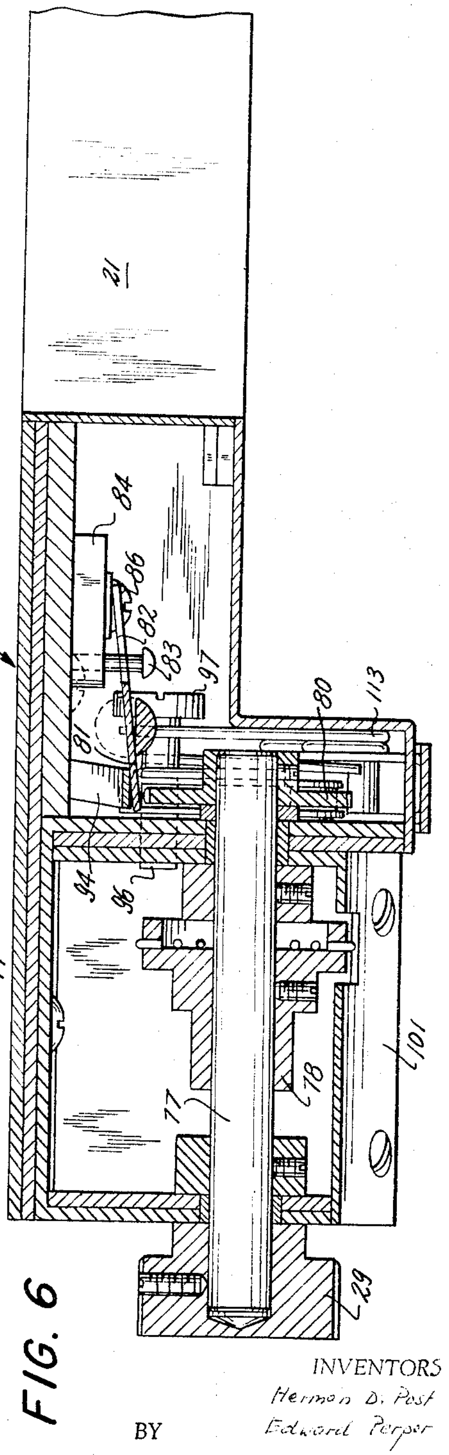
FIG. 6 is a sectional plan view taken along line 6—6 of FIG. 2 in the direction of the arrows and also showing the covering structure which is omitted from FIG. 2.

The pressure foot 30 which was mentioned above in connection with FIG. 1 is provided to engage the tape 23 and maintain it in engagement with a substantial angular portion of the periphery of the tape engaging wheel 78, as shown most clearly in FIG. 3. The curved part of the presser foot 30 which is located next to the tape and the wheel 78 is formed with an elongated notch 107 which accomodates the pins 79 with some clearance, as is apparent from FIG. 5, so that the wheel 78 can turn freely with respect to the presser foot 30, and this notch 107 provides the presser foot with a pair of elongated curved portions 108 and 109 which are respectively located closely adjacent to the periphery of the wheel 78 on opposite sides of the pins 79, as is apparent from FIG. 5. The presser foot 30 has, as shown most clearly in FIG. 4, an extension which extends beside the wall 76, spaced somewhat to the right therefrom, as viewed in FIG. 2, and this extension 110 of the presser foot 30 is supported for turning movement by the pin 111 fixed to the wall 76, and addition the extension 110 is formed with a keyhole notch 112. On end of an over center wire spring 113 is hooked into the notch 112 to engage the extension 110 of the presser foot 30 while the other end of the overcenter spring 113 is hooked onto the pin 96. When the end 114 (FIG. 4) of the spring 113 is below the pivot 111 the spring 113 tends to turn the presser foot 30 in a clockwise direction about the pivot 111, as viewed in FIG. 4, so as to maintain the portions 108 and 109 of the presser foot in their operative positions shown in FIGS. 3 and 5. However, when it is desired to remove a tape 23 or to thread it onto the perforator the operator will pull the presser foot 30 forwardly so as to turn the extension 110 in a counterclockwise direction, as viewed in FIG. 4, and as soon as the lower end 114 of the spring 113 moves above the axis of the pivot 111 the overcenter spring 113 will urge the presser foot 30 in a counterclockwise direction, as viewed in FIG. 4, so as to maintain the presser foot 30 in the inoperative position thereof illustrated in FIG. 1 where the portions 108 and 109 are displaced away from the wheel 78, so that it is now an easy matter for the operator to remove the tape 23 or to thread it onto the perforator.

The hollow cover structure 24, 25 can be slipped to the left, as viewed in FIG. 1, over the various parts so as to have the covering position shown most clearly in FIG. 1, and in this position the cover 24, 25 can be fixed to the support means through suitable screw members, and in this way all of the above-described components are protected while at the same time it is an easy matter to have access to the mechanism whenever desired.

While elements such as the punches 37 must be made of a relatively high quality steel so as to have the desired properties, and the same of course is true of the various springs, nevertheless it is not necessary that all of the structure be made of a heavy metal. Certain parts can be made of light metals or even of plastic materials, so that in this way the weight of the entire perforator can be cut to a minimum and the operator will not tire from holding and operating the perforator.

As was pointed out above, the upper flange 34 has fixed thereto a plate 65, as shown most clearly in FIG. 7, and this plate 65 has a front flange 115, shown most clearly in FIGS. 3 and 4, for receiving some of the screws which fix the cover structure 24, 25 to the perforator.

It will be understood that each of the elements described above, or two or more together, may also find a useful application in other types of perforators differing from the types described above.

While the invention has been illustrated and described as embodied in tape perforators, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A portable tape perforator comprising, in combination, a flat perforator unit having a narrow front face, a narrow rear face arranged opposite said narrow front face and opposite narrow upper and bottom faces; support means forming part of said flat perforating unit and arranged in a region thereof located near said narrow bottom face and having a tape supporting portion which is adapted to support for longitudinal movement in a direction transverse to the plane of said flat perforator unit a tape which is to be perforated; guide means forming part of said flat perforating unit and extending in direction of said narrow front and rear faces, said guide means being carried by said support means adjacent said tape supporting portion thereof; a plurality of punches respectively having punching ends directed toward but spaced from said tape supporting portion when said punches are in a given rest position, said punches being guided by said guide means for movement in directions which displace said punching ends of said punches toward and away from said tape supporting portion; substantially cylindrical punch-engaging means forming part of said flat perforating unit and located near said narrow upper face thereof with its axis extending in direction of said narrow upper and bottom faces and carried by said support means for selectively engaging and displacing selected punches away from their rest positions in directions which displace said punching ends of said selected punches through a tape supported by said tape supporting portion of said support means to perforate the tape with the selected punches acted upon by said punch engaging means; and manually operable handle means extending rearwardly from said narrow rear face of said flat perforating unit and operatively connected to said punch engaging means for actuating the latter.

2. A portable tape perforator comprising, in combination, a flat perforator unit having a narrow front face, a narrow rear face arranged opposite said narrow front face and opposite narrow upper and bottom faces; support means forming part of said flat perforating unit and arranged in a region thereof located near said narrow bottom face and having a tape supporting portion which is adapted to support for longitudinal movement in a direction transverse to the plane of said flat perforator unit a tape which is to be perforated; a plurality of elongated punches forming part of said flat perforating unit and each thereof extending in direction of said narrow front and rear faces and respectively having punching ends which in a given rest position of said punches are directed toward but spaced from said tape supporting portion of said support means so that a tape which is to be perforated can be placed between said tape supporting portion and said punching ends of said punches; spring means engaging said punches for yieldably maintaining the latter in said rest position; guide means forming part of said flat perforating unit and extending in direction of said narrow front and rear faces, said guide means being carried by said support means and guiding said punches for movement at said punching ends thereof toward and away from said tape supporting portion; substantially cylindrical punch engaging means forming part of said flat perforating unit and located near said narrow upper face thereof with its axis extending in direction of said narrow upper and bottom faces and carried by said support means and located, at least in part, adjacent said punches for selectively engaging and displacing selected punches in directions which move the punching ends of the selected punches toward said tape supporting portion through a tape thereon for perforating the tape with the selected punches, said punch engaging means having a rest position out of engagement with said punches and said spring means returning the selected punches to their rest position when said punch engaging means is in its rest position out of engagement with said punches; and manually operable handle means extending rearwardly from said narrow rear face of said flat perforating unit and operatively connected to said punch engaging means for actuating the latter.

3. A portable tape perforator comprising, in combination, a flat perforator unit having a narrow front face, a narrow rear face arranged opposite said narrow front face and opposite narrow upper and bottom faces; support means forming part of said flat perforating unit and arranged in a region thereof located near said narrow bottom face and having a tape supporting portion adapted to support for longitudinal movement in a direction transverse to the plane of said flat perforator unit a tape which is to be perforated, said tape being of the type which has distributed along its length a row of successive areas located one after the other and adapted to be successively perforated; a plurality of elongated punches forming part of said flat perforating unit and each thereof extending in direction of said narrow front and rear faces and respectively having punching ends spaced from and directed toward said tape supporting portion in a rest position of said punches so that a tape which is to be perforated can be placed between said punching ends of said punches and said tape supporting portion engaging the latter; guide means forming part of said flat perforating unit and extending in direction of said narrow front and rear faces, said guide means being carried by said support means and guiding said punches for movement at said punching ends thereof toward and away from said tape supporting portion; substantially cylindrical punch engaging means forming part of said flat perforating unit and located near said narrow upper face thereof with its axis extending in direction of said narrow upper and bottom faces and carried by said support means for selectively engaging and advancing selected punches in a direction which displaces the punching ends of the selected punches through a tape supported by said tape supporting portion so as to perforate a tape with the selected punches, said punch engaging means having a rest position out of engagement with said punches; spring means carried by said support means and operatively engaging said punches for yieldably maintaining the latter in said rest position thereof, said spring means automatically returning the selected punches to their rest position when said punch engaging means returns to its rest position out of engagement with said punches; tape-advancing means for engaging a tape which is supported by said tape supporting portion and for advancing the tape, after one of its plurality of successive areas has been perforated, through a distance locating the next one of said areas of said tape in alignment with said punches to be selectively perforated thereby said tape advancing means forming part of said flat perforating unit and being arranged in a region thereof located near said narrow bottom face; and manually operable handle means extending rearwardly from said narrow rear face of said flat perforating unit and operatively connected to said punch engaging means for actuating the latter.

4. A portable tape perforator according to claim 3, wherein said tape advancing means carried by said support means for advancing a tape after one of its areas has been selectively perforated through a distance situating the next area of the tape in a position to be selectively perforated during the next cycle of operation of said perforating means, said tape advancing means being operatively connected to said perforating means to be actuated by the latter to advance the tape after one area thereof has been perforated.

5. A portable tape perforator according to claim 4, wherein said tape advancing means is automatically actuated by said perforating means to advance a tape after it has been perforated by said perforating means during one cycle of operation thereof, said tape advancing means also being manually operable for selectively placing any selected area of the tape in a position to be perforated.

6. A portable tape perforator according to claim 1, said manually operable means including handle means fixed to and extending from said support means to provide hand support of the perforator during operation thereof and an operating handle adjacent said handle means to be moved by the operator with respect to said handle means for actuating said perforating means, and said perforator further comprising manually operable tape advancing means for advancing the tape relative to said tape supporting portion to place a selected portion of the tape in a position to be selectively perforated.

7. A portable tape perforator comprising, in combination, a flat perforator unit having a narrow front face, a narrow rear face arranged opposite said narrow front face and opposite narrow upper and bottom faces; support means forming part of said flat perforating unit and arranged in a region thereof located near said narrow bottom face and having a tape supporting portion which is adapted to support a tape which is to be perforated; tape advancing means carried by said support means adjacent said tape supporting portion thereof for engaging and advancing a tape longitudinally along a given path relative to said tape supporting portion, said path being substantially normal to the direction of extension of said narrow front and rear faces; a plurality of elongated punches forming part of said flat perforating unit and each thereof extending in direction of said narrow front and rear faces and distributed transversely of said path and respectively having punching ends directed toward but spaced from said tape supporting portion in a rest position of said punches; spring means engaging said punches for yieldably maintaining the latter in said rest position; substantially cylindrical punch engaging means forming part of said flat perforating unit and located near said narrow upper face thereof with its axis extending in direction of said narrow upper and bottom faces and carried by said support means for selectively engaging selected punches and displacing the latter in directions which advance said punching ends of the selected punches through a tape supported by said tape supporting portion; manually operable moving means extending rearwardly from said rear face and operatively connected to said punch engaging means for actuating the latter to move selected punches in opposition to said spring means away from the rest position of the selected punches to perforate a tape with the selected punches; and second spring means operatively connected to said punch engaging means for returning the latter to a rest position out of engagement with said punches when said punches are in their rest position.

8. A portable tape perforator comprising, in combination, support means having a tape supporting portion adapted to support a tape which is to be perforated; a plurality of elongated punches respectively having punching ends directed toward said tape supporting portion and free ends respectively opposed to said punching ends thereof; a punch engaging member located adjacent said free ends of said punches and formed with a plurality of cutouts adapted to be selectively aligned with said punches so as to leave between said cutouts an exterior surface portion of said punch engaging member directed toward said free ends of selected punches which are to be actuated for perforating a tape; carrier means carrying said punch engaging member; guide means carried by said support means and guiding said carrier means for movement in a direction which places the exterior surface of said punch engaging member in engaging with free ends of selected punches to displace the selected punches in directions which move said punching ends of the selected punches through a tape supported by said tape supporting portion to perforate the tape, the non-selected punches being received in cutouts of said punch engaging member so that the non-selected punches are not displaced from their rest position; and manually operable lever means carried by said support means and operatively connected to said carrier means for displacing the latter relative to said guide means in a direction which displaces said punch engaging member relative to said free ends of said punches to actuate the latter, said manually operable lever means including a pair of overlapping lever portions pivotally connected to each other and a spring means yieldably holding said lever portions in an operative position relative to each other where there is substantially no change in the relative position between said lever portions during actuation of said manually operable lever means, and said spring means yielding to prevent damage to the perforator in the event that movement of any of its parts is obstructed.

9. A perforator as recited in claim 8 and wherein a first spring means is carried by said support means and operatively engages said punches to yieldably maintain the latter in their rest positions and a second spring means engages said support means and said carrier means for urging the latter relative to said support means to a position which locates said punch engaging member out of engagement with but adjacent said free ends of said punch means.

10. A portable tape perforator according to claim 1, further comprising, tape advancing means forming part of said flat perforating unit and being arranged in a region thereof located near said narrow bottom face, said tape advancing means including supporting portion of said support means; a rotary shaft carried by said support means; tape engaging means carried by said rotary shaft for rotation therewith and adapted to engage a tape for advancing the latter when said rotary shaft is turned; a ratchet wheel fixed to said rotary shaft; a pawl engaging said ratchet wheel and supported for swinging movement by said support means; and means operatively connecting said perforating means to said pawl for swinging the latter back and forth during a cycle of operations of said perforating means for turning said shaft by turning of said ratchet wheel by said pawl through an angle advancing the tape through a given increment during each cycle of operations of said perforating means after a tape has been perforated thereby.

11. A portable tape perforator comprising, in combination, support means having a tape supporting portion for supporting a tape which is to be perforated; perforating means carried by said support means for selectively perforating a tape during a cycle of operations of said perforating means, said perforating means including an elongated rod which reciprocates back and forth during each operating cycle of said perforating means and which is supported by said support means for movement; a rotary shaft supported for rotation by said support means; tape engaging means carried by said shaft and engaging the tape for moving the latter during rotation of said shaft; a ratchet wheel carried by said shaft for rotation therewith; a pawl supported for swinging movement by said support means and operatively connected to said rod to be swung back and forth by said rod during each operating cycle of said perforating means, said pawl engaging said ratchet to turn the latter and said shaft therewith through a given increment which advances a tape by a given increment by turning of said tape engaging means with said shaft; camming means carried by said support means and engaging said pawl for camming the latter beyond the edge of a tooth of said ratchet wheel after said pawl has advanced said ratchet wheel through a given increment, so that said ratchet wheel can then turn relative to said pawl in both directions; and manually-engageable means operatively connected to said shaft for manually turning the latter with respect to said pawl to locate any selected portion of a tape in a position to be perforated.

12. A perforator as recited in claim 11 and wherein said pawl is in the form of a leaf spring having one edge which engages the teeth of the ratchet wheel and having opposed to said one edge a tongue deflected from the plane of said leaf spring, said camming means engaging said tongue to rock said edge of said pawl away from the tooth which it engages during advancing of the ratchet wheel so that said edge will ride past the edge of said tooth beyond the latter to a position where the leaf spring engages the tips of the teeth of the pawl but does not prevent the rotation thereof.

13. A portable tape perforator comprising, in combination, a wall formed with a notch through which a tape which is to be perforated is adapted to pass, said wall having a pair of guide flanges on one side of said notch and a supporting flange on the other side of said notch adapted to support a tape which is to be perforated, said guide flanges being respectively formed with aligned openings; a plurality of elongated punches extending through said aligned openings and guided in said openings by said guide flanges for longitudinal movement, said punches respectively having punching ends directed toward said supporting flange and free ends located opposite said punching ends thereof and out of the space between said flanges; spring means engaging said punches for maintaining them in rest positions where said punching ends thereof are directed towards but spaced from said supporting flange; a rod extending through said guide flanges parallel to said punches; a shaft carried by said rod and extending over said free ends of said punches; a rotary selecting member turnable on said shaft over said free ends of said punches and formed with cutouts adapted to be aligned with said punches so that punches which are not aligned with cutouts are adapted to be selected for actuation during movement of said rod in a direction which displaces said selecting member against said free ends of said punches to displace the latter toward said supporting flange; spring means maintaining said selecting member in a rest position adjacent but spaced from said free ends of said punches; and manually operable lever means pivotally carried by said wall and operatively connected to said rod for moving the latter in a direction which displaces said selected member against said punches to displace the latter for perforating the tape on said supporting flange.

14. A perforator as recited in claim 13 and wherein said lever engages one of said flanges to limit movement of said selecting member away from said punches and thus determine the starting position of said selecting member.

15. A perforator as recited in claim 13 and wherein the spring means which maintains said punches in said rest positions thereof includes a leaf spring carried by said support means and having a plurality of separate tongues respectively engaging said punches, said punches respectively being formed with notches which receive free ends of said tongues of said leaf spring, and said tongues of said leaf spring engaging one of said pair of guide flanges to determine the rest position of said punches.

16. A perforator as recited in claim 13 and wherein said supporting flange is formed with openings respectively aligned with said openings of said guide flanges and receiving said punching ends of said punches after said punching ends pass through a tape to perforate the latter.

17. A portable tape perforator according to claim 1 further comprising, tape advancing means forming part of said flat perforating unit and being arranged in a region thereof located near said narrow bottom face, said tape advancing means including a rotary shaft carried by said support means; tape engaging means carried by said rotary shaft for engaging the tape supported at said supporting portion for advancing the tape when said shaft is rotated; a ratchet wheel fixed to said shaft; a pawl supported for swinging movement by said support means and engaging said ratchet wheel; means connecting said perforating means to said pawl for swinging the latter back and forth to move said ratchet wheel by a given increment after each operating cycle of said perforating means to perforate a tape, so as to advance a tape by a given increment after it is perforated; a lever carried by said support means for swinging movement toward and away from said ratchet wheel; spring means urging said lever toward said ratchet wheel; and a roller turnably carried by said lever and maintained yieldably in engagement with said ratchet wheel by said spring means so that said roller and ratchet wheel cooperate to form a releasable detent structure for determining the positions of said shaft and tape engaging means after advance of said shaft.

18. A perforator as recited in claim 17 and wherein a manually engageable means is carried by said shaft in the region of said front face and accessible to the operator for manually turning said shaft so as to manually advance the tape, and said roller cooperating with said ratchet wheel during manually turning of said shaft to maintain said shaft in one of a plurailty of predetermined angular positions after manual turning of said shaft.

References Cited by the Examiner

UNITED STATES PATENTS

| | | | |
|---|---|---|---|
| 1,429,719 | 9/1922 | Day | 234—100 X |
| 1,476,273 | 12/1923 | Swanson | 234—100 X |
| 3,035,762 | 5/1962 | Drillick | 234—115 |
| 3,063,622 | 11/1962 | Nold | 234—100 |
| 3,096,016 | 7/1963 | Flieg | 234—128 X |
| 3,127,982 | 4/1964 | Bearden | 234—129 X |
| 3,189,269 | 6/1965 | Pannozzo | 234—45 |

WILLIAM S. LAWSON, *Primary Examiner.*